US012418760B1

(12) United States Patent
Temme et al.

(10) Patent No.: US 12,418,760 B1
(45) Date of Patent: Sep. 16, 2025

(54) AUDIO MEASUREMENT SYSTEM

(71) Applicant: Listen, Inc., Boston, MA (US)

(72) Inventors: Steve F. Temme, Boston, MA (US); Rahul Shayka, Boston, MA (US)

(73) Assignee: Listen, Inc., Boston, MA (US)

( * ) Notice: Subject to any disclaimer, the term of this patent is extended or adjusted under 35 U.S.C. 154(b) by 287 days.

(21) Appl. No.: 18/122,569

(22) Filed: Mar. 16, 2023

Related U.S. Application Data

(60) Provisional application No. 63/320,402, filed on Mar. 16, 2022.

(51) Int. Cl.
*H04R 29/00* (2006.01)

(52) U.S. Cl.
CPC .................................. *H04R 29/001* (2013.01)

(58) Field of Classification Search
CPC .................................................... H04R 29/001
See application file for complete search history.

(56) References Cited

U.S. PATENT DOCUMENTS

2020/0228906 A1* 7/2020 Myers .................. H04R 29/001

* cited by examiner

*Primary Examiner* — Andrew Sniezek
(74) *Attorney, Agent, or Firm* — Occhiuti & Rohlicek LLP

(57) ABSTRACT

A method for testing a loudspeaker includes receiving a response signal characterizing a response of the loudspeaker to a stimulus signal, the response signal including a number of parts, each part including a reproduction of a corresponding part of the stimulus signal and distortion, computing a distortion spectrum including a plurality of distortion values. The computing includes, for each part of the response signal, processing the part of the response signal to determine a first value characterizing a human perceptible component of the distortion present in the part of the response signal, processing the part of the response signal to determine a second value characterizing a degree of harmonic distortion of the part of the response signal, and forming a distortion value for the part of the response signal based on a combination of the first value and the second value. A test result is formed based on a comparison of the distortion spectrum to a threshold.

17 Claims, 5 Drawing Sheets

AUDIO MEASUREMENT SYSTEM

CROSS-REFERENCES TO RELATED APPLICATIONS

This application claims the benefit of U.S. Provisional Application No. 63/320,402 filed Mar. 16, 2022, the entire contents of which are incorporated herein by reference.

BACKGROUND OF THE INVENTION

Measurement of an audio device (e.g., a loudspeaker) generally involves applying a calibrated and amplified stimulus signal to the audio device and sensing a response of the audio device to the stimulus using a calibrated sensor (e.g., a measurement microphone). From the stimulus and response, various output parameters of audio devices can be measured, including but not limited to frequency response, impedance, distortion, total harmonic distortion, sensitivity, and so on. When producing loudspeakers, the measured output parameters can be used to determine whether devices meet quality control standards.

One quality issue commonly encountered in loudspeaker production is termed "rub and buzz." Rub and buzz generally refers to the presence of higher order harmonics, which create a harsh buzzing sound that often becomes particularly obvious at higher playback levels. In the context of a loudspeaker, such sounds are created when something abruptly impedes the free movement of the speaker mechanism, for example, loose glue joints, vibrating voice coil lead wires hitting another loudspeaker part (e.g., the cone, or an incorrectly centered and rubbing voice coil).

SUMMARY OF THE INVENTION

Some techniques for detecting rub and buzz compare measured higher order harmonics to a threshold. If the measured higher order harmonics exceed the threshold, then a rub and buzz fault is present. But those conventional techniques are unable to distinguish rub and buzz faults that are perceptible by the human ear from those that are not perceptible. This can lead to false positives, where a loudspeaker with imperceptible rub and buzz is rejected.

Aspects described herein relate to a technique for rub and buzz detection that detects rub and buzz in a way that accounts for human perception. In some aspects, a partial noise loudness (PNL) and the error harmonic structure (EHS) of the measured response are designed to increase immunity of the rub and buzz detection algorithm to noise. For example, for each tone in a stepped, swept sine stimulus, computation of a rub and buzz detection result includes mitigating the effects of environmental noise on the PNL and determining the EHR of the recorded signal to represent where the harmonic structure of the recorded signal lies on a range between "high harmonic distortion" (e.g., a sawtooth wave) and "no harmonic distortion" (e.g., a pure tone). The resulting rub and buzz detection algorithm represents just how much of the PNL is due to harmonic distortion.

In a general aspect, a method for testing a loudspeaker includes receiving a response signal characterizing a response of the loudspeaker to a stimulus signal, the response signal including a number of parts, each part including a reproduction of a corresponding part of the stimulus signal and distortion, computing a distortion spectrum including a plurality of distortion values. The computing includes, for each part of the response signal, processing the part of the response signal to determine a first value characterizing a human perceptible component of the distortion present in the part of the response signal, processing the part of the response signal to determine a second value characterizing a degree of harmonic distortion of the part of the response signal, and forming a distortion value for the part of the response signal based on a combination of the first value and the second value. A test result is formed based on a comparison of the distortion spectrum to a threshold.

Aspects may include one or more of the following features.

Determining the first value may include computing a partial noise loudness based on a reference spectrum and a test spectrum. The reference spectrum may include a spectrum of the part of the response signal with harmonic frequencies removed, ear weighting applied, synthetic noise added, and perceptual filtering applied. The test spectrum may include a spectrum of the part of the response signal with ear weighting applied and perceptual filtering applied. Determining the second value may include quantifying the harmonic distortion of the response signal in a range, wherein a lowest value of the range is associated with no harmonic distortion and a highest value of the range is associated with high harmonic distortion.

A response signal including a sawtooth wave may be associated with the highest value of harmonic distortion. The test result may characterize whether the distortion in the response signal is perceptible to the human ear. The harmonic distortion may be due to a rub and buzz defect in the loudspeaker. The method may include presenting the test result to a user. The stimulus signal may include sequence of sinusoidal tones, each tone in the sequence of sinusoidal tones having a different frequency.

Computing the distortion spectrum may include, for each part of the response signal, removing non-harmonic frequencies from a spectrum of the part of the response signal. Computing the distortion spectrum may include, for each part of the response signal, adjusting an amplitude of a spectrum of the part of the response signal using a factor determined using a Perceptual Evaluation of Audio Quality (PEAQ) standard. Computing the distortion spectrum may include, for each part of the response signal, applying an ear weighting factor to a spectrum of the part of the response signal.

In another general aspect, a loudspeaker testing system is configured to implement the method described above. In another general aspect, software embodied on a non-transitory, computer readable medium includes instructions for implementing the method described above.

Among other advantages, aspects described herein can determine whether rub and buzz distortion of a device under test is perceptible by the human ear. If a device has imperceptible rub and buzz distortion, prior approaches would mark that device as defective. Aspects described herein would not necessarily mark that device as defective, resulting in an increased production yield for the device producer.

DETAILED DESCRIPTION

1 Overview

Figure 1:
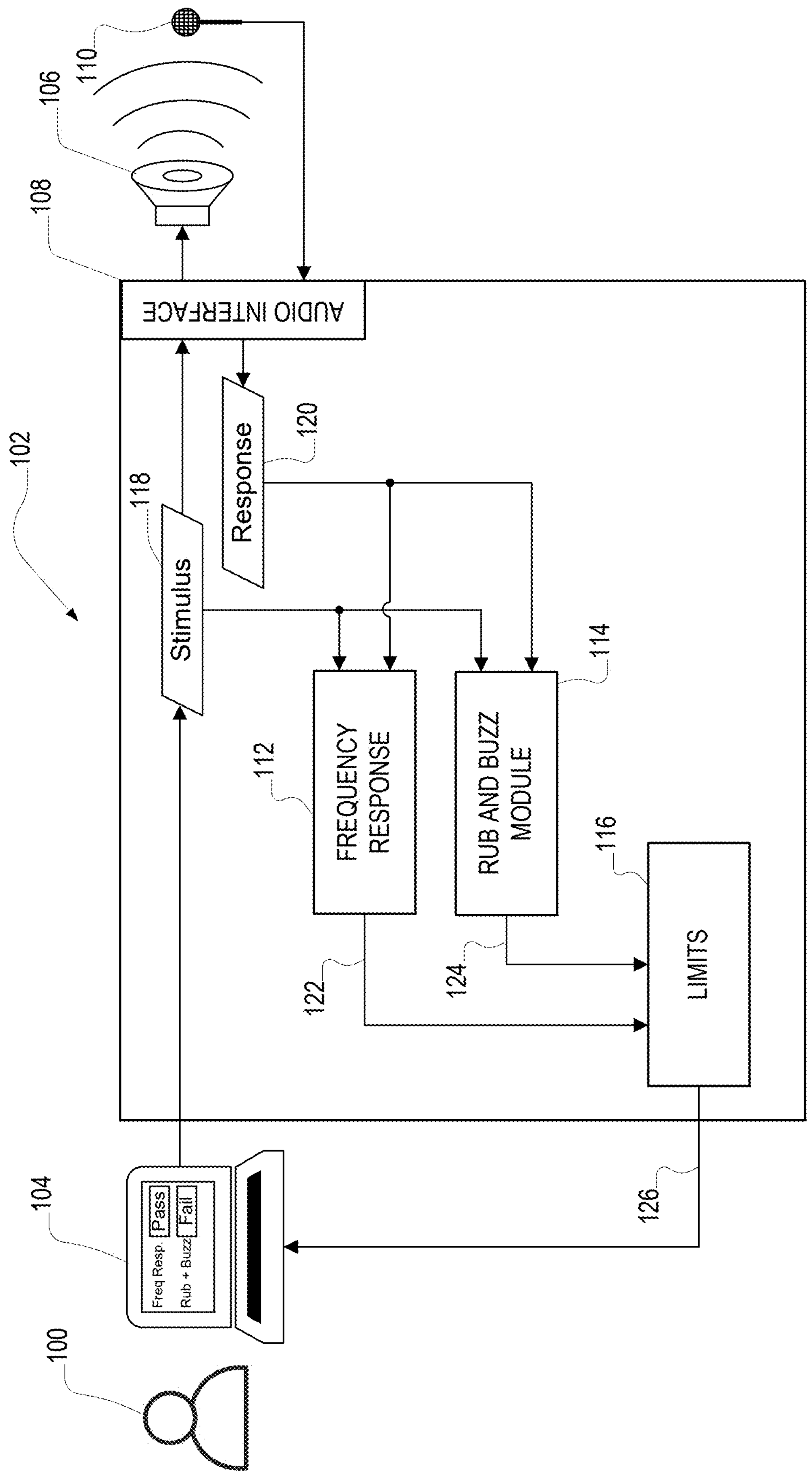
FIG. 1 is a schematic diagram of an acoustic test and measurement system.

Referring to FIG. 1, a user 100 is interacting with an acoustic test and measurement system 102 using a computer interface 104 to test properties of an acoustic device under test such as a loudspeaker 106 or another acoustic transducer. One common application of the acoustic test and measurement system 102 is quality control of loudspeakers being manufactured on a production line.

In the simple example of FIG. 1, the acoustic test and measurement system 102 includes an audio interface 108 (e.g., a soundcard), a microphone 110, a frequency response module 112, a rub and buzz module 114, and a limits module 116. In operation, the user initiates a test using the computer interface 104, causing a stimulus waveform 118 to be played from the loudspeaker 106 via the audio interface 108. In some examples, the stimulus waveform 108 is a stepped, swept sine wave that includes a sequence of tones with increasing or decreasing frequencies.

The microphone 110 measures sound pressure as the loudspeaker 106 plays the stimulus waveform 118. The measured sound pressure is digitized by the audio interface 108 to generate a response waveform 120. The stimulus waveform 118 and the response waveform 120 are provided to the frequency response module 112, which processes the waveforms to generate a frequency response curve 122 of the loudspeaker 106. The stimulus waveform 118 and the response waveform 120 are also provided to a rub and buzz module 114, which processes the waveforms to generate a rub and buzz curve 124 representing an amount of rub and buzz distortion present in the response waveform 120 that is perceptible to the human ear.

The frequency response curve 122 and the rub and buzz curve 124 are provided to the limits module 116 which applies limits such as frequency-dependent thresholds to the curves to determine test results 126 representing whether the curves are in acceptable ranges for the loudspeaker 106 to "pass" the test. The test results 126 are presented to the user 100 via the computer interface 104.

It is noted that the acoustic test and measurement system 102 is simplified for the sake of brevity. It should be understood that the system is capable of many other types of tests and measurements such as harmonic distortion and impedance measurement, etc. Furthermore, the system is capable of testing many different types of transducers in addition to loudspeakers such as microphones and hearing aids.

2 Rub and Buzz Module

As is noted above, the rub and buzz module 114 generates a curve that represents an amount of rub and buzz distortion present in the response waveform that a human ear can perceive. One effect of incorporating human perception into the measurement of rub and buzz distortion is that loudspeakers with significant rub and buzz distortion can still pass as good loudspeakers if that distortion is not perceptible to the human ear. In essence, false positive test results for rub and buzz distortion are reduced.

Figure 2:
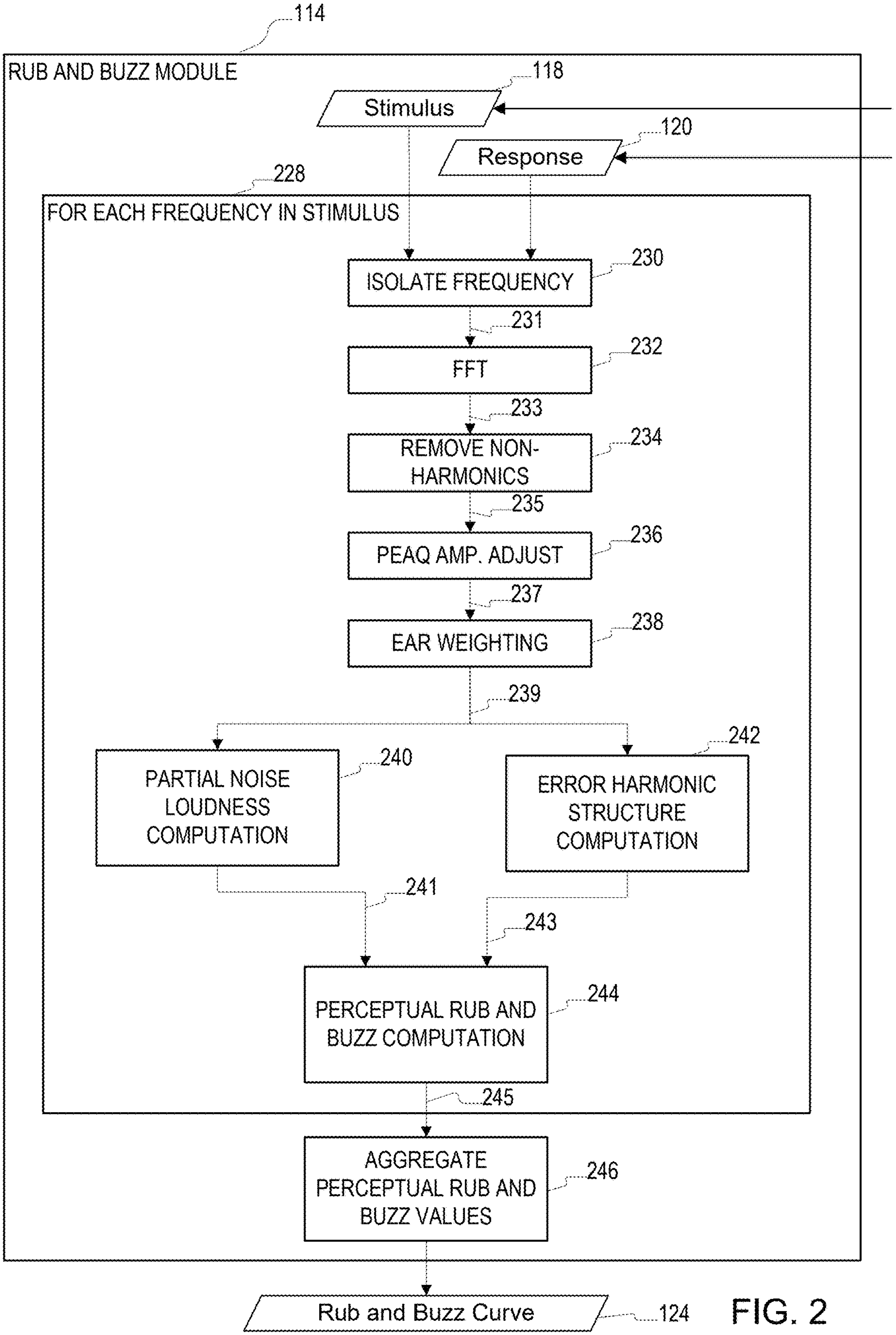
FIG. 2 is a schematic diagram of a rub and buzz detection module.

Referring to FIG. 2, the rub and buzz module 114 receives the stimulus and response waveforms 118, 120 as input and processes those inputs to generate the rub and buzz curve 124. In some examples, the rub and buzz module 114 includes a loop 228, where each iteration of the loop corresponds to a different tone of the sequence of tones in the stimulus waveform 120. Each iteration of the loop 228 executes a frequency isolation module 230, a Fast Fourier Transform (FFT) module 232, a non-harmonic frequency removal module 234, a PEAQ (Perceptual Evaluation of Audio Quality) amplitude adjustment module 236, an ear weighting module 238, a partial noise loudness computation module 240, an error harmonic structure computation module 242, a perceptual rub and buzz computation module 244, and an aggregation module 246.

The frequency isolation module 230 isolates a part of the time-domain response waveform 120 corresponding to a tone from of the stimulus waveform 118 (i.e., the measured response of the loudspeaker playing the corresponding tone from the stimulus). The isolated part of the response waveform 231 is provided to the FFT module 232, which windows the isolated part using, for example, a Hanning window, and computes a single-sided amplitude spectrum 233.

The amplitude spectrum 233 computed by the FFT module 232 is provided to the non-harmonic frequency removal module 234. The algorithm is concerned with harmonic distortion on pure tones, so only the frequency bins corresponding to integer multiples of the fundamental frequency of the tone associated with the isolated part of the response waveform are preserved. All other frequency bin data is discarded. One advantage of doing so is that reduces the amount of data flowing through the algorithm (lower throughput, lower processing).

The amplitude spectrum with non-harmonic frequency data removed 235 is provided to the PEAQ amplitude adjustment module 236, which multiplies the amplitude spectrum by a scaling factor (e.g., 52961.029) as determined according to the PEAQ standard.

The scaled amplitude spectrum 237 output by the PEAQ amplitude adjustment module 236 is output to the ear weighing module 238, which scales the amplitude in each frequency bin by a frequency-dependent ear weighting factor. In some examples, the ear weighting factors are determined according to a frequency-dependent weighting function such as that described in section 4.4 of "*Temme,* 2009" (Temme, Steve & Brunet, Pascal & Keele, D. (2009). Practical Measurement of Loudspeaker Distortion Using a Simplified Auditory Perceptual Model. 127th Audio Engineering Society Convention 2009. 2.), the contents of which are incorporated herein in their entirety.

The ear-weighted spectrum 239 output by the ear weighting module 238 is provided to both the partial noise loudness computation module 240 and the error harmonic structure computation module 242. The partial noise computation module 240 processes the ear-weighted spectrum 239 to determine a partial noise loudness value 241 representing the perceived loudness of noise present in the isolated part of the response waveform. The error harmonic structure computation module 242 processes the ear-weighted spectrum to determine an error harmonic structure value 243 representing where the harmonic structure of the isolated part of the response waveform lies on a range between "high harmonic distortion" (e.g., a sawtooth wave) and "no harmonic distortion" (e.g., a pure tone). Both the partial noise loudness computation module 240 and the error harmonic structure module 242 are described in greater detail below.

The determined partial noise loudness and error harmonic structure values 241,243 are provided to the perceptual rub and buzz computation module 244, which generates a perceptual rub and buzz value 245 for the isolated part of the response waveform 231. The perceptual rub and buzz value 245 represents just how much of the partial noise loudness is due to harmonic distortion from rub and buzz. In some examples, the perceptual rub and buzz value 245 is determined by multiplying the partial noise loudness by the error harmonic structure value.

As the loop 228 iterates, the aggregation module 246 aggregates perceptual rub and buzz values 245 generated in the loop 228 and ultimately combines the values to form the rub and buzz curve 124.

2.1 Partial Noise Loudness Computation

Figure 3:
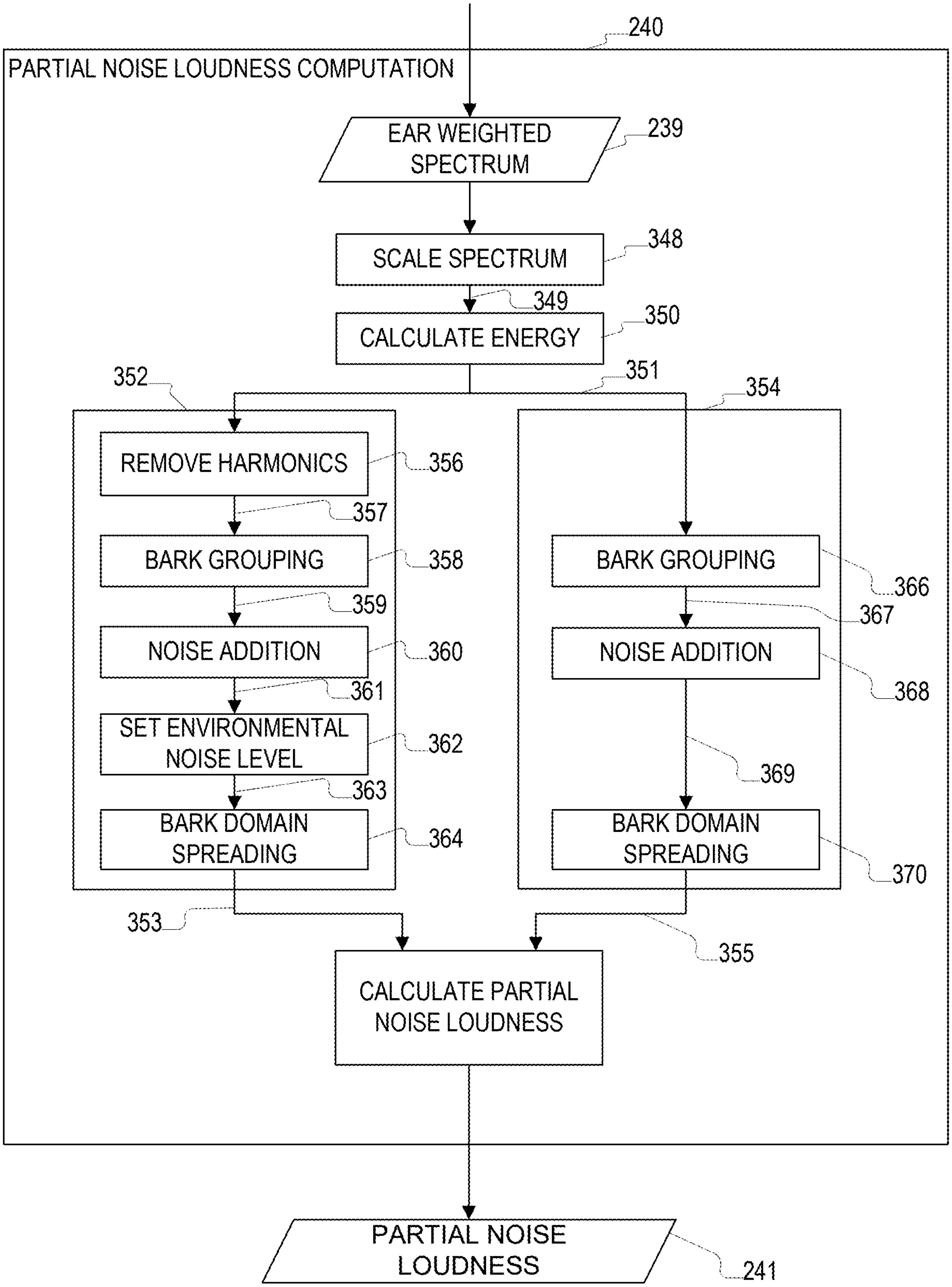
FIG. 3 is a schematic diagram of a partial noise loudness computation module.

Referring to FIG. 3, as is described above, the ear weighted spectrum 239 is provided to the partial noise loudness computation module 240, which processes the ear weighted spectrum to generate the partial noise loudness value 241.

The partial noise loudness computation module 240 includes a spectrum scaling module 348, an energy calculation module 350, a reference bark spectrum computation module 352, a degraded bark spectrum computation module 354, and a partial noise loudness calculation module 356.

The ear weighted spectrum 239 is first processed in the spectrum scaling module 348, which scales the spectrum 239 by a scaling factor to allow masking curves to be adjusted for level. In some examples, the scaling factor is set to −12 dB.

The scaled ear weighted spectrum 349 is provided to the energy calculation module 350, which squares each frequency bin value to determine the energy in the frequency bin, resulting in an energy spectrum 351. The frequency bin values are then multiplied by a factor of 1.5 to account for the energy lost due to the previous removal of all the energy in the non-harmonic frequency bins. For example, with any windowing there is some spectral leakage into adjacent bins. This energy was lost when the non-harmonic frequency bins were discarded and is recouped in this step by adding a factor of 0.5.

The energy spectrum 351 is provided to both the reference bark spectrum computation module 352 and the degraded bark spectrum computation module 354. The reference bark spectrum computation module 352 processes the energy spectrum 351 to generate a reference bark spectrum 353 (as is described in greater detail below). The degraded bark spectrum computation module 354 processes the energy spectrum 351 to generate a degraded bark spectrum 355 (as is described in greater detail below).

The partial noise loudness calculation module 356 processes the reference bark spectrum 353 and the degraded bark spectrum 355 to determine the partial noise loudness value 241. In some examples, the partial noise loudness value is determined as described in section 4.9 of *Temme,* 2009 (see e.g., Eq. 13). In some examples, partial noise loudness calculation module 356 works on a single frame of data without using any time domain smearing. In some examples the computation accounts for simultaneous masking, ignoring temporal masking effects such as forward and backward masking.

2.1.1 Reference Bark Spectrum Computation

The reference bark spectrum computation module 352 processes the energy spectrum 351 to generate a reference bark spectrum 353. The reference bark spectrum computation module 352 includes a harmonic removal module 356, a bark spectrum grouping module 358, a noise addition module 360, an environmental noise setting module 362, and a bark domain spreading module 364.

The energy spectrum 351 is first processed by the harmonic removal module 356, which removes all harmonic frequencies from the energy spectrum, leaving only the fundamental frequency (associated with the isolated part of the response waveform) in the spectrum.

The fundamental frequency energy spectrum 357 is provided to the bark grouping module 358, which computes a bark spectrum 359 by assigning the frequency bins in the spectrum 357 to corresponding bins in the bark frequency scale as is described, for example, in section 4.5 of *Temme,* 2009.

The bark spectrum 359 is provided to the noise addition module 360, which adds an offset to the energy in each bark bin to simulate the noise floor of the internal ear as blood flows through the ear, as is described in *Temme,* 2009.

The bark spectrum with internal noise added 360 is provided to the environmental noise setting module 362, which coerces the levels of the bark bins up to a minimum value corresponding to a desired phons level that is calculated, for example, using the equal loudness contours form ISO 226. The minimum phons level is meant to simulate a noisy environment. One example of a minimum phons level used by the noise addition module 360 is 0 phons.

The bark spectrum with environmental noise added 361 is provided to the bark domain spreading module 364, which spreads the bark bin energies using a frequency and level dependent curve to emulate the frequency masking behavior of the inner ear. An example of spreading the bark bin energies is described in section 4.7 of *Temme,* 2009. The result of the bark domain spreading module is the reference bark spectrum 353.

2.1.2 Degraded Bark Spectrum Computation

The degraded bark spectrum computation module 354 processes the energy spectrum 351 to generate a degraded bark spectrum 355. The degraded bark spectrum computation module 354 includes a bark spectrum grouping module 366, a noise addition module 368, and a bark domain spreading module 370.

The energy spectrum 351 is first processed by the bark spectrum grouping module 366, which computes an initial degraded bark spectrum 367 by assigning the frequency bins in the energy spectrum 351 to corresponding bins in the bark frequency scale as is described, for example, in section 4.5 of *Temme,* 2009.

The initial degraded bark spectrum 367 is provided to the noise addition module 368, which adds an offset to each bark bin energy to simulate the noise floor of the internal ear as blood flows through the ear, as is described in *Temme,* 2009.

The initial degraded bark spectrum with internal noise added 369 is provided to the bark domain spreading module 370, which spreads the bark bin energies using a frequency and level dependent curve to emulate the frequency masking behavior of the inner ear. An example of spreading the bark bin energies is described in section 4.7 of *Temme,* 2009. The result of the bark domain spreading module is the degraded bark spectrum 355.

2.2 Error Harmonic Structure Computation

Figure 4:
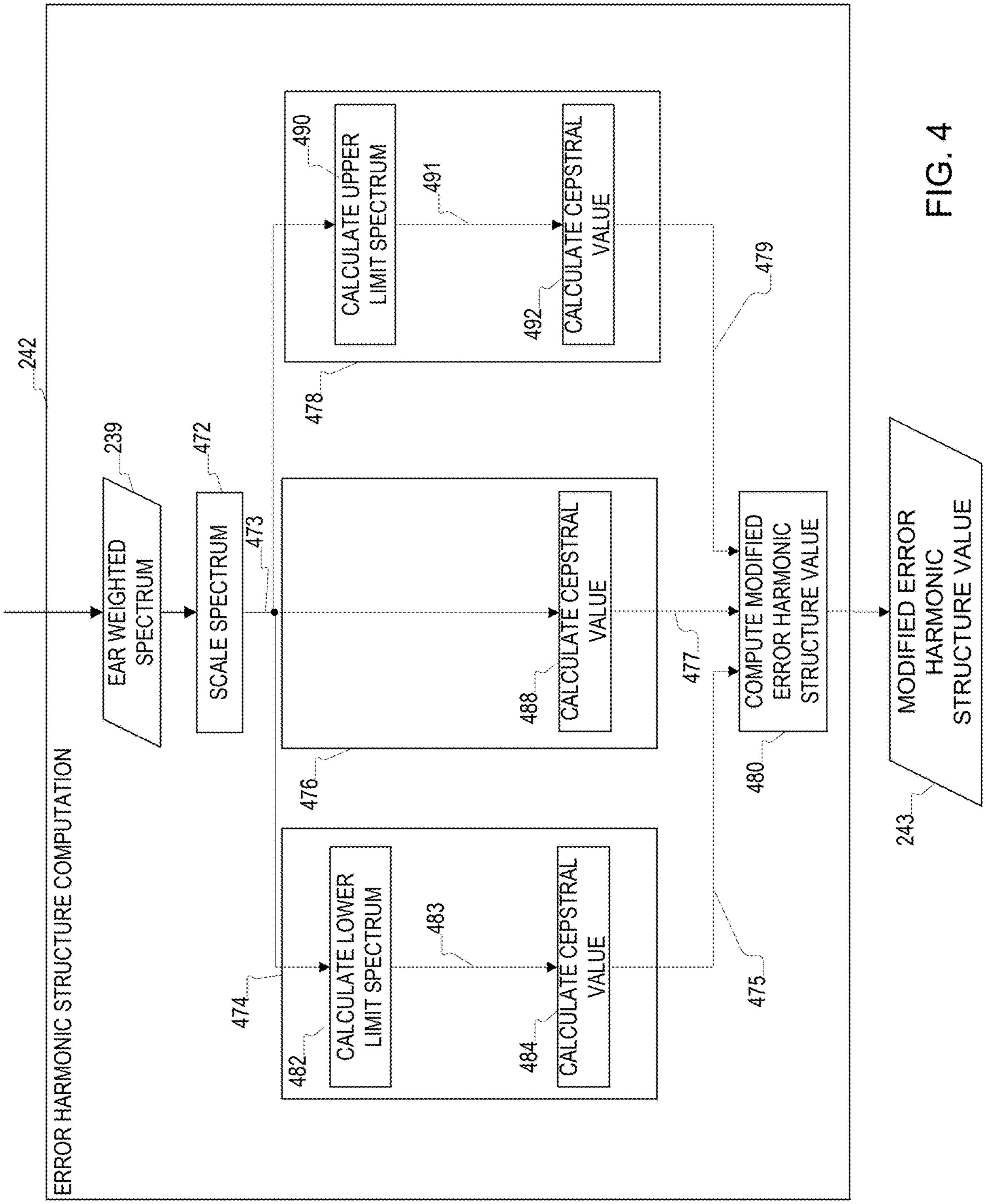
FIG. 4 is a schematic diagram of a error harmonic structure computation module.

Referring to FIG. 4, as is described above, the ear weighted spectrum 239 is provided to the error harmonic structure computation module 242, which processes the ear weighted spectrum to generate the error harmonic structure value 243. In some examples, the error harmonic structure value 243 represents where the harmonic structure of the isolated part of the recorded signal lies on a scale from 0 to 1, where 1 means "high harmonic distortion" (e.g., a sawtooth wave) and 0 means "no harmonic distortion" (e.g., a pure tone).

The error harmonic structure computation module 242 includes a spectrum scaling module 472, a first branch 474 for calculating a first, lower-limit value 475, a second branch 476 for calculating a second value 477, and a third branch 478 for calculating a third, upper-limit value 479.

The first, lower limit value 476, the second value 477, and the third, upper limit value 479 are provided to the error harmonic structure value computation module 480, which processes the three values to generate the error harmonic structure value 243.

In operation, the ear weighted spectrum 239 is first processed in the spectrum scaling module 427, which scales the spectrum 239 by a scaling factor. In some examples, the scaling factor is −12 dB.

The scaled spectrum 473 is provided to the first branch 474, which first processes the scaled spectrum 473 in a lower limit spectrum calculation module 482 to determine a lower limit spectrum 483. In some examples, the lower limit spectrum calculation module 482 does so based on a level of the fundamental frequency of the scaled spectrum (i.e., the fundamental frequency of the tone associated with the isolated part of the response waveform). In some examples, the lower limit spectrum calculation module creates the lower limit value 475 by first generating a bark spectrum 483 from the isolated part of the response waveform, processed by applying ear weighting (as described above), to remove harmonics (as described above), to group into bark bins (as described above), to add internal noise (as described above), and to apply bark domain spreading (as described above). The generated bark spectrum 483 is provided to a cepstral value calculation module 484, which performs an FFT operation on the bark spectrum, yielding cepstral values including rahmonics corresponding to the fundamental tone. The rahmonics are averaged, yielding the first, lower limit value 475.

The scaled spectrum 473 is provided to the second branch 476, which processes the scaled spectrum 473 in a second cepstral value calculation module 488. The second cepstral value calculation module performs an FFT operation on the scaled spectrum 473, yielding cepstral values including rahmonics corresponding to the fundamental tone. The rahmonics are averaged, yielding the second value 477.

The scaled spectrum 473 is also provided to the third branch 478, which first processes the scaled spectrum 473 in an upper limit spectrum calculation module 490 to determine an upper limit spectrum 491. In some examples, the upper limit spectrum calculation module 490 does so by generating a sawtooth waveform with the same number of samples as isolated part of the recorded signal, performing an FFT of the signal (as described above), removing non-harmonics from the signal (as described above), adjusting the amplitude for PEAQ (as described above), and applying an ear weighting function (as described above). The spectrum is scaled such that the amplitude of the fundamental tone matches that in the recorded signal spectrum, resulting in the upper limit spectrum 491.

The upper limit spectrum is provided to a third cepstral value calculation module 492, which performs an FFT operation on the upper limit spectrum 491, yielding cepstral values including rahmonics corresponding to the fundamental tone. The rahmonics are averaged, yielding the third, upper limit value 479.

The first, lower limit value 475, the second value 477, and the third, upper limit value 479 are provided to the error harmonic structure value computation module 480, which scales the second value 477 linearly between the first, lower limit value 475 and the third, upper limit value 479 and then multiplies the value by a scale factor (e.g., two). The resulting error harmonic structure value 243 is coerced to lie between 0 and 1.

3 Results

Figure 5:
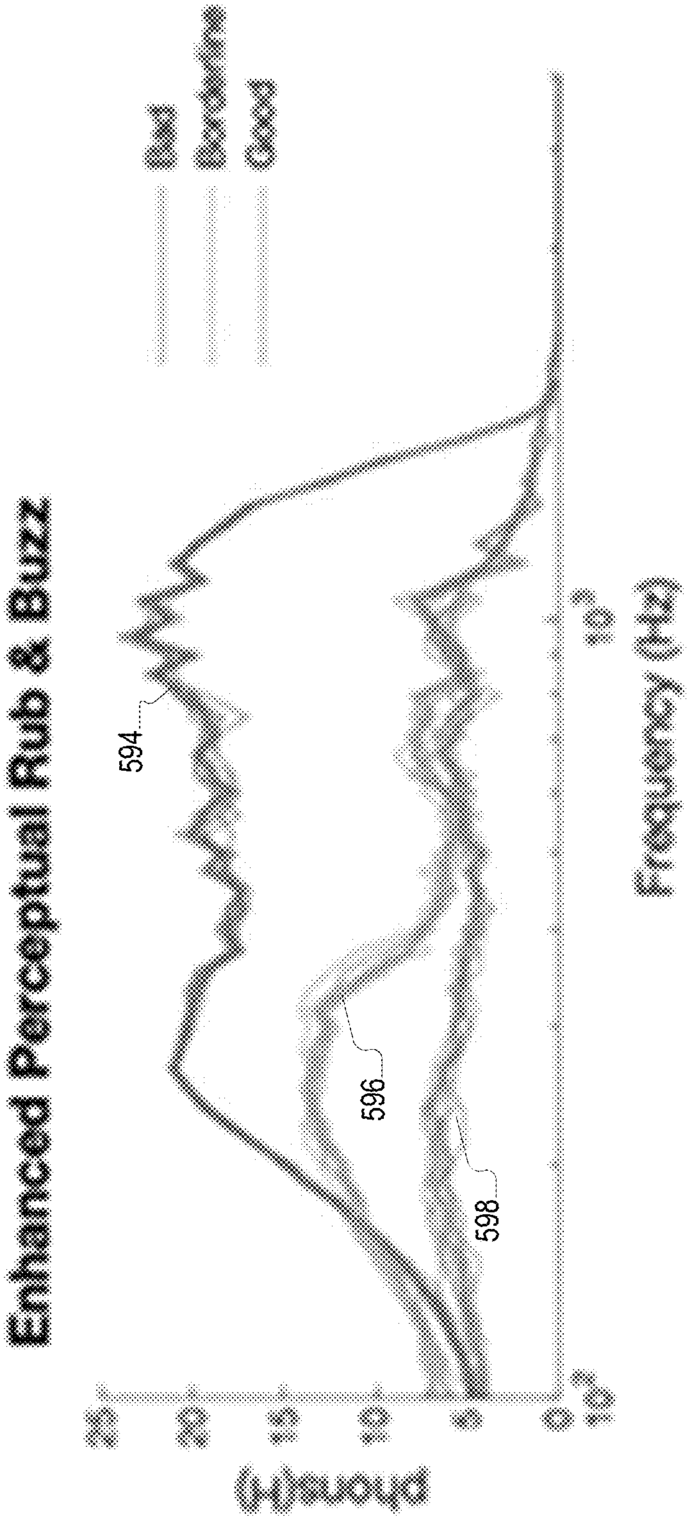
FIG. 5 is a graph showing perceptual rub and buzz curves for good, borderline, and bad transducers.

Referring to FIG. 5, rub and buzz curves generated by the system described above show clear separation in human perceptible rub and buzz distortion between good loudspeakers 594, borderline loudspeakers 596, and bad loudspeakers 598.

4 Implementations

The approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program. The modules of the program can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for testing a loudspeaker, the method comprising:

receiving a response signal characterizing a response of the loudspeaker to a stimulus signal, the response signal including a plurality of parts, each part including a reproduction of a corresponding part of the stimulus signal and distortion;

computing a distortion spectrum including a plurality of distortion values, the computing including, for each part of the response signal, processing the part of the response signal to determine a first value characterizing a human perceptible component of the distortion present in the part of the response signal, processing the part of the response signal to determine a second value characterizing a degree of harmonic distortion of the part of the response signal, and forming a distortion value for the part of the response signal based on a combination of the first value and the second value; and forming a test result based on a comparison of the distortion spectrum to a threshold.

2. The method of claim 1 wherein determining the first value includes computing a partial noise loudness based on a reference spectrum and a test spectrum.

3. The method of claim 2 wherein the reference spectrum includes a spectrum of the part of the response signal with harmonic frequencies removed, ear weighting applied, synthetic noise added, and perceptual filtering applied.

4. The method of claim 2 wherein the test spectrum includes a spectrum of the part of the response signal with ear weighting applied and perceptual filtering applied.

5. The method of claim 1 wherein determining the second value includes quantifying the harmonic distortion of the response signal in a range, wherein a lowest value of the range is associated with no harmonic distortion and a highest value of the range is associated with high harmonic distortion.

6. The method of claim 5 wherein a response signal including a sawtooth wave is associated with the highest value of harmonic distortion.

7. The method of claim 1 wherein the test result characterizes whether the distortion in the response signal is perceptible to the human ear.

8. The method of claim 7 wherein the harmonic distortion is due to a rub and buzz defect in the loudspeaker.

9. The method of claim 1 further comprising presenting the test result to a user.

10. The method of claim 1 wherein the stimulus signal includes sequence of sinusoidal tones, each tone in the sequence of sinusoidal tones having a different frequency.

11. The method of claim 1 wherein computing the distortion spectrum further comprises, for each part of the response signal, removing non-harmonic frequencies from a spectrum of the part of the response signal.

12. The method of claim 1 wherein computing the distortion spectrum further comprises, for each part of the response signal, adjusting an amplitude of a spectrum of the part of the response signal using a factor determined using a Perceptual Evaluation of Audio Quality (PEAQ) standard.

13. The method of claim 1 wherein computing the distortion spectrum further comprises, for each part of the response signal, applying an ear weighting factor to a spectrum of the part of the response signal.

14. The method of claim 1 wherein the distortion value comprises a perceptual rub and buzz value, the first value comprises a partial noise loudness value, and the second value comprises an error harmonic structure value.

15. A loudspeaker testing system comprising:

an input for receiving a response signal characterizing a response of the loudspeaker to a stimulus signal, the response signal including a plurality of parts, each part including a reproduction of a corresponding part of the stimulus signal and distortion;

one or more processors configured to process the response signal including computing a distortion spectrum including a plurality of distortion values, the computing including, for each part of the response signal, processing the part of the response signal to determine a first value characterizing a human perceptible component of the distortion present in the part of the response signal, processing the part of the response signal to determine a second value characterizing a degree of harmonic distortion of the part of the response signal, and forming a distortion value for the part of the response signal based on a combination of the first value and the second value; and an output for providing a test result determined based on a comparison of the distortion spectrum to a threshold.

16. A non-transitory, computer readable medium having stored therein software for implementing a method for testing a loudspeaker, the method comprising:

receiving a response signal characterizing a response of the loudspeaker to a stimulus signal, the response signal including a plurality of parts, each part including a reproduction of a corresponding part of the stimulus signal and distortion;

computing a distortion spectrum including a plurality of distortion values, the computing including, for each part of the response signal, processing the part of the response signal to determine a first value characterizing a human perceptible component of the distortion present in the part of the response signal, processing the part of the response signal to determine a second value characterizing a degree of harmonic distortion of the part of the response signal, and forming a distortion value for the part of the response signal based on a combination of the first value and the second value; and forming a test result based on a comparison of the distortion spectrum to a threshold.

17. A method for testing a loudspeaker, the method comprising:

receiving a response signal characterizing a response of the loudspeaker to a stimulus signal, the response signal including a plurality of parts, each part including a reproduction of a corresponding part of the stimulus signal and distortion;

computing a distortion spectrum including a plurality of distortion values, the computing including, for each part of the response signal, processing the part of the response signal to determine a partial noise loudness value characterizing a human perceptible component of the distortion present in the part of the response signal, processing the part of the response signal to determine an error harmonic structure value characterizing a degree of harmonic distortion of the part of the response signal, and forming a perceptual rub and buzz value for the part of the response signal based on a combination of the partial noise loudness value and the error harmonic structure value; and forming a test result based on a comparison of the distortion spectrum to a threshold.

* * * * *